US007865825B2

(12) United States Patent
Godoy et al.

(10) Patent No.: US 7,865,825 B2
(45) Date of Patent: Jan. 4, 2011

(54) STANDARD TEXT METHOD, SYSTEM, AND PROGRAM PRODUCT FOR CONFIGURING AND PUBLISHING TEXT TO MULTIPLE APPLICATIONS

(75) Inventors: Glenn C. Godoy, Endwell, NY (US); Charles E. McNeill, Fairfax, VA (US); Amy J. Snavely, Binghamton, NY (US)

(73) Assignee: International Business Machines Corporation, Armonk, NY (US)

( * ) Notice: Subject to any disclaimer, the term of this patent is extended or adjusted under 35 U.S.C. 154(b) by 687 days.

(21) Appl. No.: 10/881,447

(22) Filed: Jun. 30, 2004

(65) Prior Publication Data

US 2006/0004835 A1    Jan. 5, 2006

(51) Int. Cl.
*G06F 17/21* (2006.01)
*G06F 17/22* (2006.01)

(52) U.S. Cl. .......................... 715/256; 715/227; 705/44
(58) Field of Classification Search .................. 715/531, 715/511, 256
See application file for complete search history.

(56) References Cited

U.S. PATENT DOCUMENTS

| | | | |
|---|---|---|---|
| 5,694,546 A | 12/1997 | Reisman | |
| 5,848,421 A | 12/1998 | Brichta et al. | |
| 6,496,803 B1 * | 12/2002 | Seet et al. | 705/14.73 |
| 6,636,886 B1 | 10/2003 | Katiyar et al. | |
| 6,687,874 B2 | 2/2004 | Burgess | |
| 6,725,203 B1 * | 4/2004 | Seet et al. | 705/14.53 |
| 6,963,930 B2 * | 11/2005 | Halpert et al. | 709/246 |
| 7,130,792 B2 * | 10/2006 | Tokieda et al. | 704/7 |
| 7,363,578 B2 * | 4/2008 | Bendsen et al. | 715/236 |
| 2001/0047297 A1 * | 11/2001 | Wen | 705/14 |
| 2002/0072997 A1 * | 6/2002 | Colson et al. | 705/27 |
| 2002/0083097 A1 * | 6/2002 | Warrington | 707/513 |
| 2002/0087496 A1 * | 7/2002 | Stirpe et al. | 706/45 |
| 2002/0099533 A1 * | 7/2002 | Jaqua | 704/1 |
| 2003/0101043 A1 * | 5/2003 | Boegelund et al. | 704/3 |
| 2003/0115552 A1 * | 6/2003 | Jahnke et al. | 715/536 |
| 2003/0182234 A1 * | 9/2003 | Degroot | 705/51 |
| 2004/0010456 A1 | 1/2004 | Hoang | |
| 2004/0044727 A1 * | 3/2004 | Abdelaziz et al. | 709/203 |
| 2004/0117377 A1 | 6/2004 | Moser et al. | |
| 2004/0220791 A1 * | 11/2004 | Lamkin et al. | 703/11 |

(Continued)

OTHER PUBLICATIONS

Blundo et al.;"A Lightweight Protocol for the Generation and Distribution of Secure E-coupons"; 2002;AMC;pp. 542-552.*

(Continued)

*Primary Examiner*—Doug Hutton
*Assistant Examiner*—James J Debrow
(74) *Attorney, Agent, or Firm*—William E. Schiesser; Hoffman Warnick LLC (57) ABSTRACT

The present provides a standard text method, system, and program product for configuring blocks of text and for defining the circumstances under which the blocks of text are to be displayed to users by multiple applications. The method comprises: providing a block of text to be published; selecting at least one application that will use the block of text; defining at least one business entity to which the block of text pertains; defining criteria under which the block of text will be used by each selected application; and repeating the above steps for each additional block of text to be published.

30 Claims, 5 Drawing Sheets

U.S. PATENT DOCUMENTS

2005/0034068 A1* 2/2005 Jaeger .................. 715/517
2005/0198573 A1* 9/2005 Ali et al. ................ 715/536
2006/0184525 A1* 8/2006 Jones et al. ................ 707/6

OTHER PUBLICATIONS

Lu et al.,"Translation of Web Queries Using Anchor Text Mining",ACM, Jun. 2002, pp. 542-552.*
Ruch et al.,"Query Translation by Text Categorization", 2004, Association for Computational Linguistics, pp. 1-7.*
Somers et al.,"Multilingual generatin and Summarization of Job Adverts: the TREE Project", 1997, Morgan kaufmann Publishers Inc, pp. 269-276.*
Emerick, Jerry, "Managing XML Data Storage", 2002, ACM, pp. 1-13.*
Brown, A.F.R.,"Language Translation", ACM, 1958, pp. 1-8.*
Yeh et al., "Analytical View of Business Data", ACM, 2004, pp. 847-852.*
Zsifkov et al, "Business Rules Domains and Business Rules Modeling", Trinity College Dublin, 2004, pp. 172-177.*

* cited by examiner

STANDARD TEXT METHOD, SYSTEM, AND PROGRAM PRODUCT FOR CONFIGURING AND PUBLISHING TEXT TO MULTIPLE APPLICATIONS

FIELD OF THE INVENTION

The present invention relates in general to the publishing of text to an application. More particularly, the present invention provides a standard text method, system, and program product for configuring blocks of text and for defining the circumstances under which the blocks of text are to be displayed to users by multiple applications.

BACKGROUND OF THE INVENTION

Often, a block of text that is to be displayed to a user of an application must be generated or updated in some manner. For example, in a product procurement application that allows a requester to view and requisition products listed in a catalog, a block of text may have to be generated/updated to reflect a change to information associated with a product. Such a block of text may include, for example, a description of the product, a product safety message corresponding to the product, a return policy for the product, information regarding sales restrictions on the product, etc. In addition, the generated/updated block of text may be required for some instances of an application and not for others. This may occur, for example, if the generation/updating of a block of text is limited to one or more locations, geographical areas, or countries. Further, the generated/updated block of text may need to be translated into another language, depending on the location of the computer on which the application is running.

The actual generation/updating of a block of text may be performed using different techniques, different personnel, different languages, etc., typically resulting in new/different coding for each instance of the application. This makes the generation/updating of a block of text difficult to support and maintain from a software point of view. As such, for these and other reasons, the generation/updating of blocks of text for multiple applications within a business can be a daunting task, especially if the applications are running on computers located at different sites around the world.

SUMMARY OF THE INVENTION

The present invention provides a standard text method, system, and program product for configuring blocks of text and for defining the circumstances under which the blocks of text are to be displayed to users by multiple applications.

A first aspect of the present invention provides a method for configuring and publishing text to multiple applications, comprising: providing a block of text to be published; selecting at least one application that will use the block of text; defining at least one business entity to which the block of text pertains; defining criteria under which the block of text will be used by each selected application; and repeating the above steps for each additional block of text to be published.

A second aspect of the present invention provides a system for configuring and publishing text to multiple applications, comprising: a system for providing a plurality of blocks of text to be published; a system for selecting at least one application that will use each block of text; a system for defining at least one business entity to which each block of text pertains; and, a system for defining criteria under which each block of text will be used by each selected application.

A third aspect of the present invention provides a program product stored on a recordable medium for configuring and publishing text to multiple applications, which when executed, comprises: program code for providing a block of text to be published; program code for selecting at least one application that will use the block of text; program code for defining at least one business entity to which the block of text pertains; program code for defining criteria under which the block of text will be used by each selected application; and program code for repeating the above steps for each additional block of text to be published.

A fourth aspect of the present invention provides a system for deploying an application for configuring and publishing text to multiple applications, comprising: a computer infrastructure being operable to: provide a plurality of blocks of text to be published; select at least one application that will use each block of text; define at least one business entity to which each block of text pertains; and, define criteria under which each block of text will be used by each selected application.

A fifth aspect of the present invention provides computer software embodied in a propagated signal for configuring and publishing text to multiple applications, the computer software comprising instructions to cause a computer system to perform the following functions: provide a plurality of blocks of text to be published; select at least one application that will use each block of text; define at least one business entity to which each block of text pertains; and, define criteria under which each block of text will be used by each selected application.

Therefore, the present invention provides a standard text method, system, and program product for configuring a block of text and for defining the circumstances under which the block of text is to be displayed to a user by an application.

BRIEF DESCRIPTION OF THE DRAWINGS

These and other features of this invention will be more readily understood from the following detailed description of the various aspects of the invention taken in conjunction with the accompanying drawings in which.

It is noted that the drawings of the invention are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

BEST MODE FOR CARRYING OUT THE INVENTION

As indicated above, the present invention provides a standard text method, system, and program product for configuring blocks of text and for defining the circumstances under which the blocks of text are to be displayed to users by multiple applications. The Standard Text function provided by the present invention allows administrators to enter configurable blocks of text and then publish the blocks of text to the appropriate business entity for the appropriate application.

Figure 1:
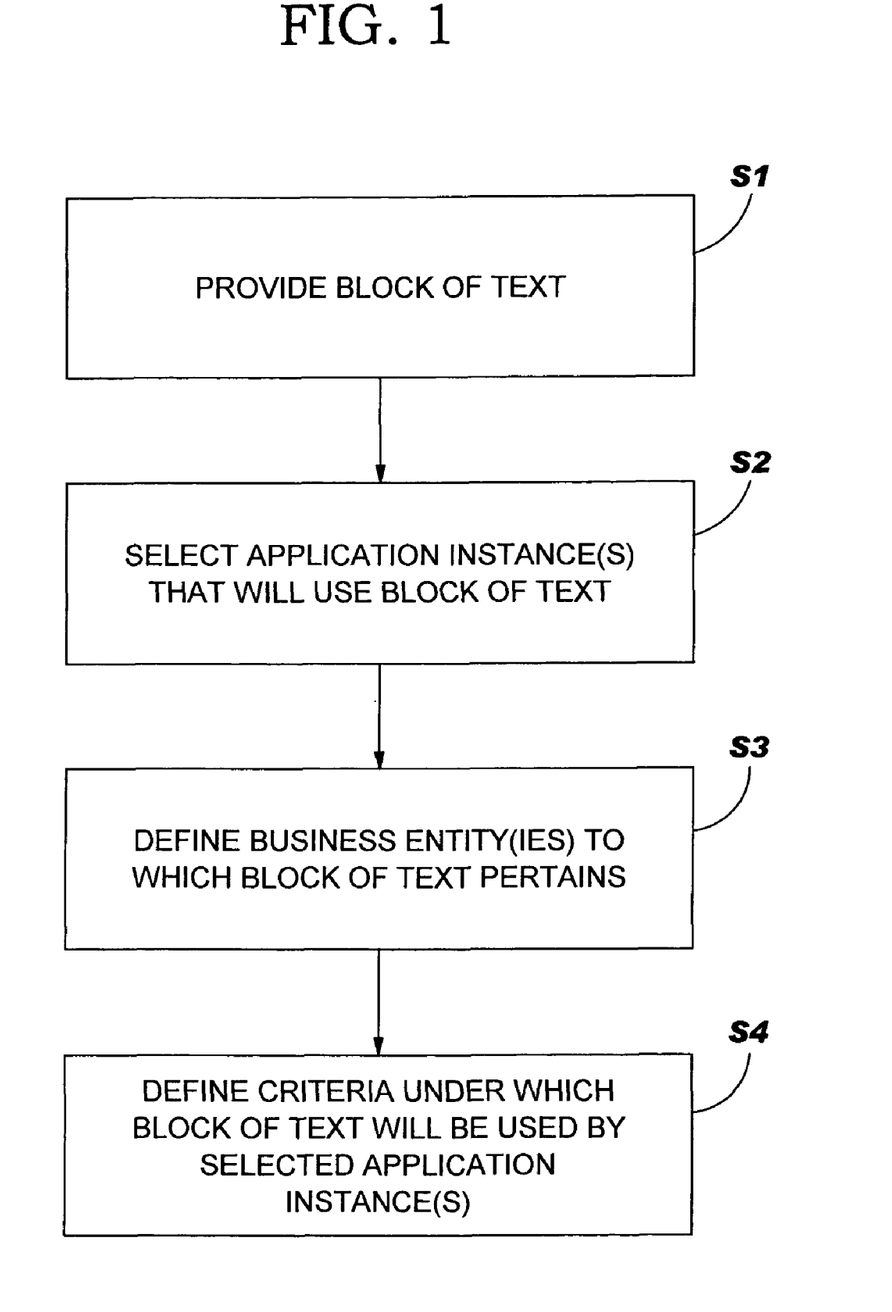
FIG. 1 is a flow diagram illustrating publishing in accordance with the present invention.

In the context of the present invention, as illustrated in FIG. 1, the term 'publish' comprises: (Step S1) providing a block of text; (Step S2) selecting at least one application instance that will use the block of text; (Step S3) defining at least one business entity to which the block of text pertains; and (Step S4) defining the criteria under which the block of text will be used by each selected application instance. For example, assume that a specific product safety message is to be published to a requisitioning application based on a requester's country. The application which then reads the product safety message will conditionally present this message to the requester based on the country to which it was published. Thus, when publishing, an administrator must select one of the messages that have been defined, select an instance of the requisitioning application, and then select from a list of countries.

The present invention provides centralized configuration of myriad business entities for a plurality of applications. Although described below with regard to product procurement applications, it will be apparent to one skilled in the art that the present invention can be used in conjunction with any type of application. In addition, it will be apparent to one skilled in the art that many different types of business entities are possible in addition to those described below.

Business entities can be shared across multiple applications, or they may be used in only one application, but shared across multiple instances of that application. Business entities common to multiple applications may comprise, for example, country code, company code, vendor information, commodity code, approver type, etc. Application specific news (uptimes, procedure changes, or new features) is an example of a business entity that supports only one application, but can be shared across multiple instances of that application. Applications may be separated into multiple instances for many reasons including, for example, support for different time zones or high transactional volumes. While some business entities may be simple, such as country code and company code, other business entities may be more complex and comprise a combination of more than one business entity. For example, the business entity "company" may comprise a combination of the business entities "country code" and "company code." Another example of a complex business entity, described in greater detail below, is the business entity "cat-comp-appr," which comprises a combination of the business entities "catalog code," "company code," and "approver type/level." A block of text associated with the business entity "cat-comp-appr," would apply to one unique catalog, within a single company code, with a specific approver type.

Figure 2:
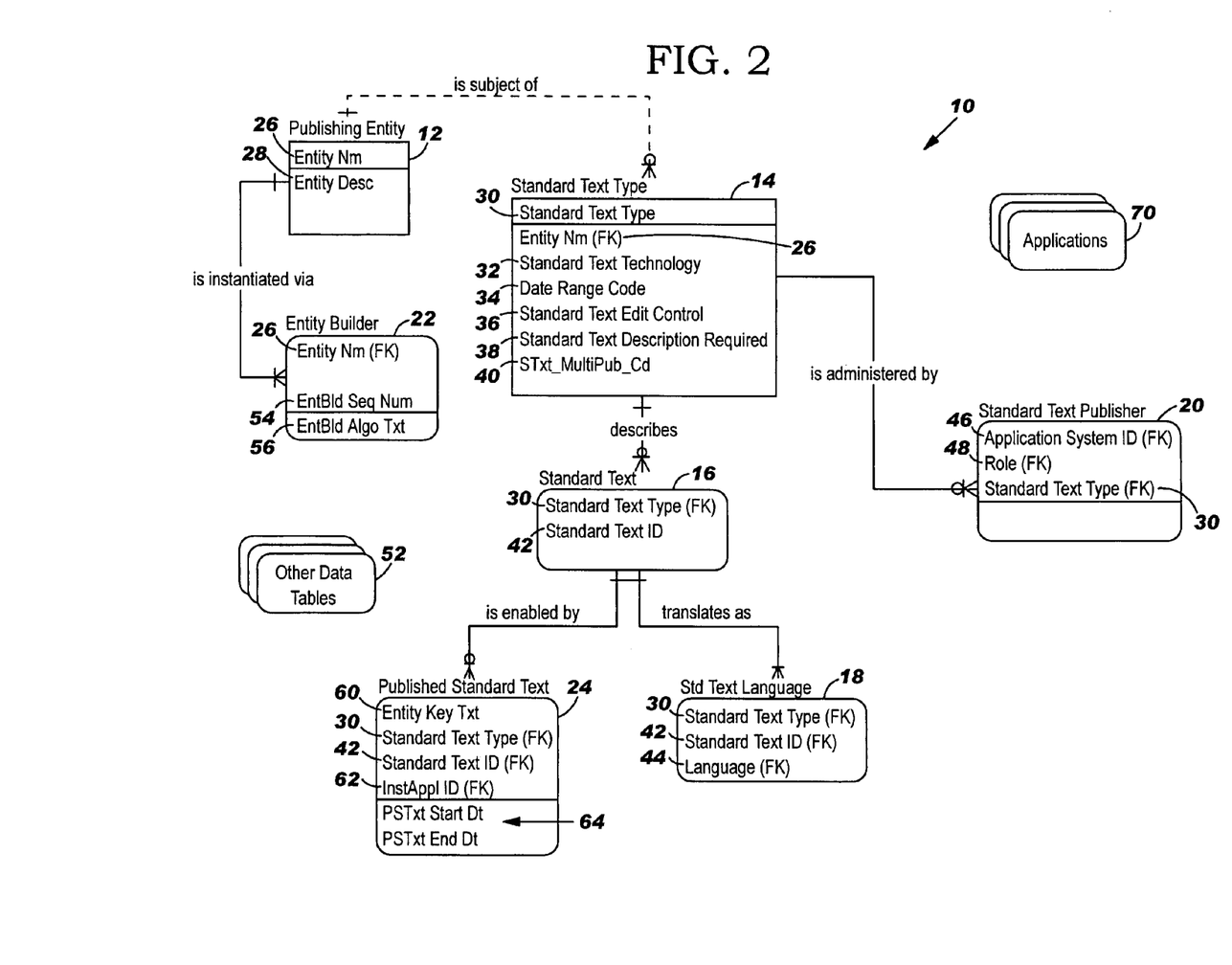
FIG. 2 depicts a plurality of linked tables that may be used to implement the present invention.

Referring now to FIG. 2, there is illustrated a data model 10 comprising a plurality of relational database tables for implementing the present invention. The tables include a publishing entity table 12, a standard text type table 14, a standard text table 16, a standard text language table 18, a standard text publisher table 20, an entity builder 22, and a published standard text table 24. It is assumed for the purposes of this description that the reader has an understanding of relational databases commensurate with one skilled in the art. Accordingly, a detailed description of relational databases is not provided herein.

The publishing entity table 12 stores information regarding each business entity. For example, the name 26 and a description 28 of each business entity can be stored in the publishing entity table 14. Other information regarding each business entity can also be included in the publishing entity table 14. Each business entity can be defined, for example, by an administrator of the system.

The standard text type table 14 contains a plurality of standard text types 30. In accordance with the present invention, a standard text type 30 can be anything from a news article, to a country-specific definition of a term (such as what criteria define a "capital purchase"), to header information that will be placed in a system-generated email, etc. It will be apparent to one skilled in the art that many other standard text types 28 are also possible. The standard text types can be defined, for example, by an administrator of the system.

Each standard text type 30 is associated with a business entity stored in the publishing entity table 12, as described above. The name 26 of the business entity is used to link a standard text type 30 stored in the standard text type table 14 to a business entity stored in the publishing entity table 12.

Additional attributes of each standard text type 30 can also stored in the standard text type table 14. For example, the technology 32 of each standard text type 30 can be provided. The technology 32 of a standard text type 30 can include a wide variety of technical information, such as whether the standard text type 30 comprises flat text, HyperText Markup Language (HTML), Extensible Markup Language (XML), or a Uniform Resource Locator (URL). Publishing characteristics can also be associated with each standard text type 30. Examples of publishing characteristics can include the date range 34 during which the standard text type 30 is valid, edit control 36 for indicating whether the standard text type 30 can be edited once it has been published, description control 38 indicating whether additional description of the standard text type 30 is required, and multiple publishing control 40 for indicating whether multiples can be published to the same business entity (e.g., true for news articles, false for definition of a capital purchase). Other attributes are also possible, and should not be limited by the examples detailed above.

The standard text table 16 and standard text language table 18 are a linked pair of tables which hold all the configured blocks of text that can be published. Each block of text in the standard text table 16 includes a standard text ID 42, which is used to identify and access the block of text, and a standard text type 30, which associates the block of text with one of the standard text types defined in the standard text type table 14. The standard text table 16 can also include other types of information regarding each block of text stored therein. The blocks of text can be provided by an administrator of the system (e.g., via a keyboard) or using any other suitable method.

The standard text language table 18 holds one or more translations of each block of text stored in the standard text table 16. Each translated block of text has the same standard text ID 42 and standard type code 30 as the parent block of text in the standard text table 16, and includes a language code 44 indicating the language of translation.

In the disclosure above, the mechanisms for defining business entities, for defining types of standard text, and for providing blocks of text (and translations thereof) have been described. At this point, the mechanism for publishing specific standard text types to specific business entities will be described. This is where the standard text publisher table 20 and the entity builder 22 come into play.

The standard text publisher table 20 provides an access and security mechanism that defines what roles can publish what types of standard text in what applications 70. For example, an administrator in Accounts Payable is not responsible for defining the term "capital purchase," and therefore cannot publish that definition to any of the applications that may use it. However, Accounts Payable is responsible for the content of emails to a user regarding confirmation of goods received, and so the Accounts Payable administrator does have the ability to publish headers and footers for those emails. These types of relationships are defined by the entries in the standard text publisher table 20. In particular, each entry in the standard text publisher 20 includes an application system ID 46, which identifies a particular application 70, a role 48, which indicates a particular role that is authorized to publish to the application 70 identified by the application system ID 46, and a standard text type 30, which references one of the standard text types defined in the standard text type table 14.

The entity builder 22 is used to determine what other data tables 52 in the system comprise each business entity stored in the publishing entity table 12. The business entity of "country" is a simple case, a physical entity, where the only table that is needed to devise a publishing key is a table of country codes. However, the more complex example of the business entity "cat-comp-appr," which comprises a combination of the business entities "catalog code," "company code," and "approver type/level," is a relational entity joining three separate business entities into one key. Rather than expecting an administrator to know how to build the appropriate key for publishing a particular block of text, the entity builder 22 is used to drive the administrator to build a key in the expected format. To this extent, the entity builder 22 provides the sequence 54 of business entities in the order they should be presented and stored, and the necessary Structured Query Language (SQL) queries that will build choice lists for the business entities, from which the administrator will select. The choice lists are built using algo text 56 (e.g., a large string of XML) stored in the entity builder 22. The selected values of the business entities comprise an entity key 60 that is stored in the published standard text table 24. It should be noted that multiple instances of each business entity in the choice list can be selected to generate a plurality of distinct entity keys. The generation of the Structured Query Language (SQL) queries for building the choice lists is within the purview of one skilled in the art to which this invention pertains, and will not be presented in detail herein.

The end result is the published standard text table 24. In addition to the standard text type 30 and standard text ID 42, each entry in the published standard text table 24 contains an entity key 60, which comprises specific values of the business entities, separated by a separator character, and the application instance 62 to which the entity key 60 is intended to be published. The entity builder 22 can be used in parsing the entity key 60, when the published standard text table 24 is being read, to determine whether the first value in the key corresponds to the first sequence number of the entity builder 22. Additionally, the published standard text table 24 contains an attribute that allows the applications certain additional control over how they use the provided text item. This attribute is configured by the administrator, and can provide certain "canned" usage methods that govern how any particular text item should be used within its particular "publishing context." An example of this is "display once per session" where a particular application can be configured to show particular text items the first time the condition is encountered, or every time. The published standard text table 24 may also include date range information 64 corresponding to the entity key 60.

The following example more clearly demonstrates an illustrative sequence of events in accordance with the present invention:

1) A business entity of cat-comp-appr is defined (e.g., by an administrator), which indicates that a particular block of text will apply to one unique catalog, within a single company code, to a specific approver type. Information regarding the business entity of cat-comp-appr is stored in the publishing entity table 12.

2) A standard text type 30 of a catalog message to an approver is defined by an administrator. This message is intended to be presented to an approver of a specific type when a requisition being approved contains items from a specific catalog and the requester belongs to a specific company code. Information regarding the standard text type 30 of a catalog message is stored in the standard text type table 14.

3) An administrator authors the message that is to be displayed. It should be noted that the administrator who authored the message to be displayed may or may not be the same administrator who defined the business entity of cat-comp-appr and/or the administrator who defined the standard text type of a catalog message. Translations can also be created, if required. When the message is saved, it is assigned a unique identifier that is used in both the standard text table 16 and the standard text language table 18.

4) The standard text publisher 20 indicates that catalog messages to an approver are to be published only by country administrators.

5) A country administrator who is responsible for publishing certain types of messages logs onto an administration application and selects the function to publish standard text. The country administrator is presented a list of standard text types, which the country administrator is authorized to publish, and the country administrator selects the entry for catalog message to an approver.

6) The business entity for cat-comp-appr has four parts: the unique catalog identifier, which is made up of two pieces of data (the source system of the catalog and the catalog identifier); the company code, which is also made up of two pieces of data (the owning country code and the company code); the approver type code, such as a management approver or a financial approver; and the approver level (e.g., there may be more than one approver of a single type on a request).

7) The entity builder 22 builds and presents to the country administrator four selection boxes, representing each of the four business entities that make up the cat-comp-appr business entity. Furthermore, since this is a country administrator who is restricted to administering data for only one country, the list of company codes is restricted (e.g., "filtered") to only those companies that are in his country. The country administrator then selects a single value from each of these four selection boxes and the entity builder builds the unique entity key 60. Information regarding the entity key 60 is stored in the published standard text table 24.

8) The published standard text table 24 now contains an entry with the standard text type 30 for catalog message to approver, the unique standard text ID 42 for the message, and an entity key 60 that may look something like this:

ERP1~USSTAP100~M~US~001~1

This entity key 60 states that the message that was authored in item (3) above should only be displayed to a first level ("1") manager ("M") when the requester is in the "US" for a company code "001," and when the requisition contains an item from the catalog "USSTAP100" which came from source system "ERP1."

9) Now it becomes the responsibility of the requisitioning application 70 to read the published standard text table 24. To do this, the requisitioning application 70 first pulls information out of a given requisition to generate its own entity key. For example, from data within the requisition, the requisitioning application is able to determine the source system of the catalog, the catalog identifier, the owning country code, and the company code. Further, the requisitioning application 70 already knows which approver type/level is looking at the requisition. Based on this data, the requisitioning application generates an entity key and then determines if there is a matching entity key 60 in the published standard text table 24. If so, the published message in the standard text table 16 or standard text language table 18 corresponding to the matching entity key 60 is presented to the approver of the requisition using the standard text technology 32 set forth in the corresponding standard text type 30. The generation of an entity key by an application and the determining of a matching entity key 60 in the published standard text table 24 can be triggered within the application in a number of ways. For example, this process may occur any time data is to be presented to a user/administrator of an application, or in response to predetermined application specific trigger events.

Figure 3:
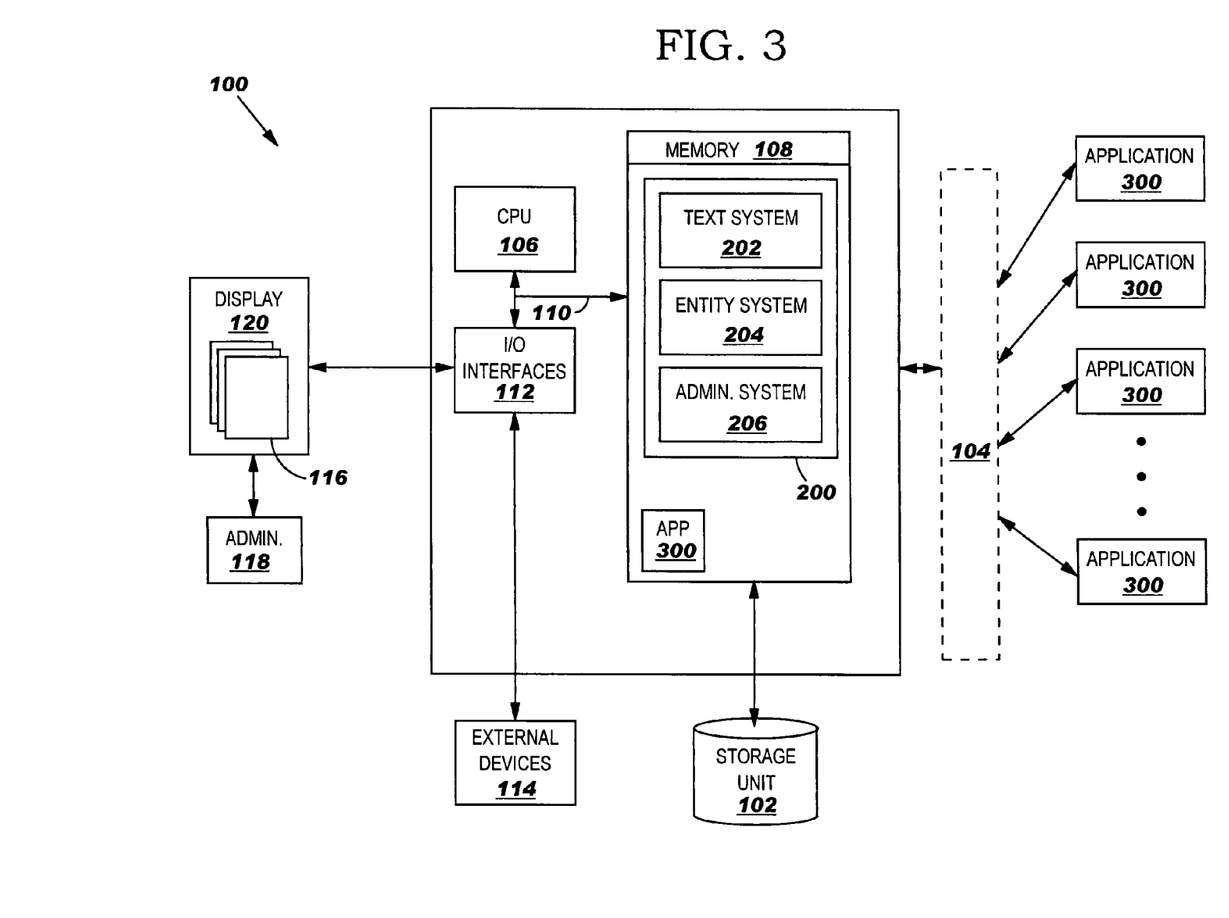
FIG. 3 depicts a computer system for configuring blocks of text and for defining the circumstances under which the blocks of text are to be displayed to users by multiple applications in accordance with the present invention.

Referring now to FIG. 3, there is illustrated a computer system 100 for configuring blocks of text and for defining the circumstances under which the blocks of text are to be displayed to users by multiple applications in accordance with the present invention. Computer system 100 is intended to represent any type of computerized system capable of implementing the present invention. For example, computer system 100 may comprise a desktop computer, laptop, workstation, server, PDA, cellular phone, pager, etc.

Data used in the practice of the present invention may be stored locally to computer system 100 in a storage unit 102, and/or may be provided to computer system 100 over a network 104. Storage unit 102 can be any system capable of providing storage for information under the present invention. As such, storage unit 102 may reside at a single physical location, comprising one or more types of data storage, or may be distributed across a plurality of physical systems in various forms. In another embodiment, storage unit 102 may be distributed across, for example, a local area network (LAN), wide area network (WAN) or a storage area network (SAN) (not shown). Regardless, the various tables used in the practice of the present invention, namely, the publishing entity table 12, standard text type table 14, standard text table 16, standard text language table 18, standard text publisher table 20, entity builder 22, and published standard text table 24, can be stored in storage unit 102. Other tables 52 of data required for the practice of the present invention can also be stored in storage unit 102.

Network 104 is intended to represent any type of network over which data can be transmitted. For example, network 104 can include the Internet, a wide area network (WAN), a local area network (LAN), a virtual private network (VPN), a WiFi network, or other type of network. To this extent, communication can occur via a direct hardwired connection or via an addressable connection in a client-server (or server-server) environment that may utilize any combination of wireline and/or wireless transmission methods. In the case of the latter, the server and client may utilize conventional network connectivity, such as Token Ring, Ethernet, WiFi or other conventional communications standards. Where the client communicates with the server via the Internet, connectivity could be provided by conventional TCP/IP sockets-based protocol. In this instance, the client would utilize an Internet service provider to establish connectivity to the server.

As shown, computer system 100 generally includes a central processing unit (CPU) 106, memory 108, bus 110, input/output (I/O) interfaces 112 and external devices/resources 114. CPU 106 may comprise a single processing unit, or may be distributed across one or more processing units in one or more locations, e.g., on a client and server. Memory 108 may comprise any known type of data storage, including magnetic media, optical media, random access memory (RAM), read-only memory (ROM), etc. Moreover, similar to CPU 106, memory 108 may reside at a single physical location, comprising one or more types of data storage, or be distributed across a plurality of physical systems in various forms.

I/O interfaces 112 may comprise any system for exchanging information to/from an external source. External devices/resources 114 may comprise any known type of external device, including speakers, a CRT, LED screen, handheld device, keyboard, mouse, voice recognition system, speech output system, printer, monitor/display, facsimile, pager, etc. In FIG. 3, for example, information 116 (e.g., blocks of text, choice lists, etc.) is displayed on a monitor/display 120 to an administrator 118.

Bus 110 provides a communication link between each of the components in computer system 100, and likewise may comprise any known type of transmission link, including electrical, optical, wireless, etc. In addition, although not shown, additional components, such as cache memory, communication systems, system software, etc., may be incorporated into computer system 100.

Shown in memory 108 is a publishing system 200, which allows one or more administrators 118 (only one is shown for clarity) to configure blocks of text to be published and to define the circumstances under which the blocks of text are to be displayed to users by multiple applications in accordance with the present invention. The publishing system 200 includes a text system 202 (e.g., a word processor or other text editor) for generating blocks of text and translations thereof (if required) for use in the standard text table 16 and standard text language table 18. The publishing system 200 also includes an entity system 204 for setting up the business entities stored in the publishing entity table 12, and for generating entity keys 60 via the entity builder 22. An administration system 206 is also provided in the publishing system 200. The administration system 206 generates the standard text types 16 stored in the standard text type table 14, defines the circumstances under which blocks of text are to be displayed to users by multiple applications (e.g., via the standard text publisher table 20), generates the entries stored in the published standard text table 24, and performs other administrative functions that may be required in the practice of the present invention. The publishing system 200, including text system 202, entity system 204, and administration system 206, can be provided as program products.

Also depicted in FIG. 3 are a plurality of applications 300. Applications 300 may comprise any type of application that is capable of displaying text, messages, etc., to a user/administrator. Applications 300 can run on one or more different computer systems, including computer system 100, and can be connected to computer system 100 via network 104.

Each application 300 can read the published standard text table 24 stored in the storage unit 102 of computer system 100 to determine if a block of text is to be published to the application. To do this, each application 70 generates its own entity key from information available to the application 300, and then determines if there is a matching entity key 60 in the published standard text table 24. If so, a block of text in the standard text table 16 or standard text language table 18 corresponding to the matching entity key 60 is published to a user/administrator of the application 300.

Figure 4:
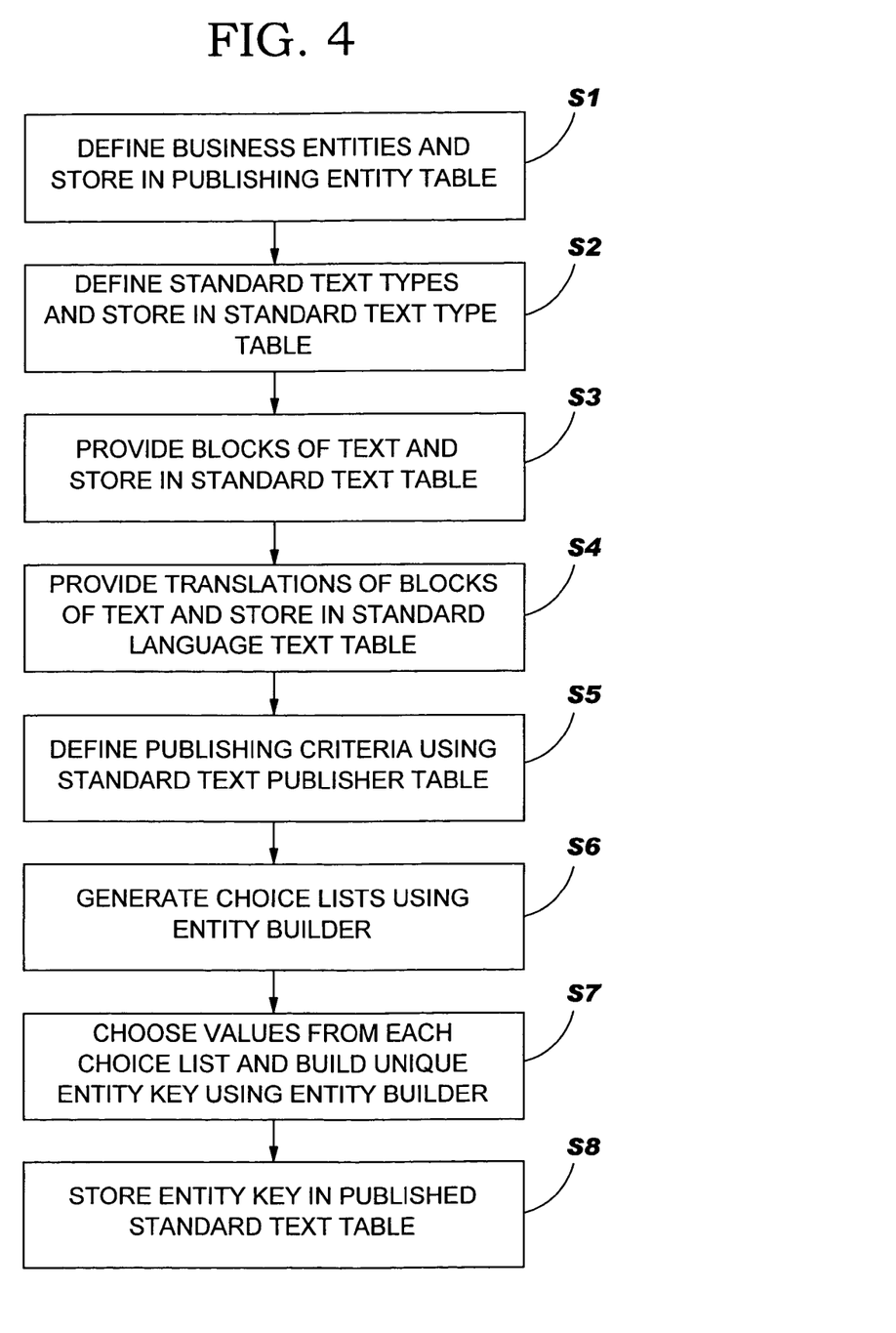
FIG. 4 depicts a flow diagram of the generation of entity keys in accordance with the present invention.

A flow diagram of the generation of entity keys 60 in accordance with the present invention is illustrated in FIG. 4. In step S1, at least one business entity is defined and stored in the publishing entity table 12. In step S2, at least one standard text type is defined and stored in the standard text type table 14. In step S3, at least one block of text to be published is authored (or provided in any other suitable manner) and stored in the standard text table 16. In step S4, one or more translations (if necessary) of each block of text authored in step S3 is provided and stored in the standard text language table 18. In step S5, the criteria under which each block of text stored in the standard text table 16 and standard text language table 18 is to be published is defined, based on information in the standard text publisher table 20. In step S6, choice lists are generated and presented to an administrator by the entity builder 22 for each business entity stored in the publishing entity table 12. In step S7, the administrator chooses a single value from each of choice lists presented by the entity builder 22 and the entity builder 22 builds a unique entity key 60 based on the administrator's choices. In step S8, the entity key 60 is stored in the published standard text table 24, along with all necessary information (e.g., standard text type 30, standard text ID 42, etc.) for publishing a corresponding block of text. It will be apparent to one skilled in the art that many of the above steps can be performed in a different order than that illustrated in FIG. 4. For example, blocks of text can be authored and stored before or after the definition of the business entities and before or after the defining of standard text types.

Figure 5:
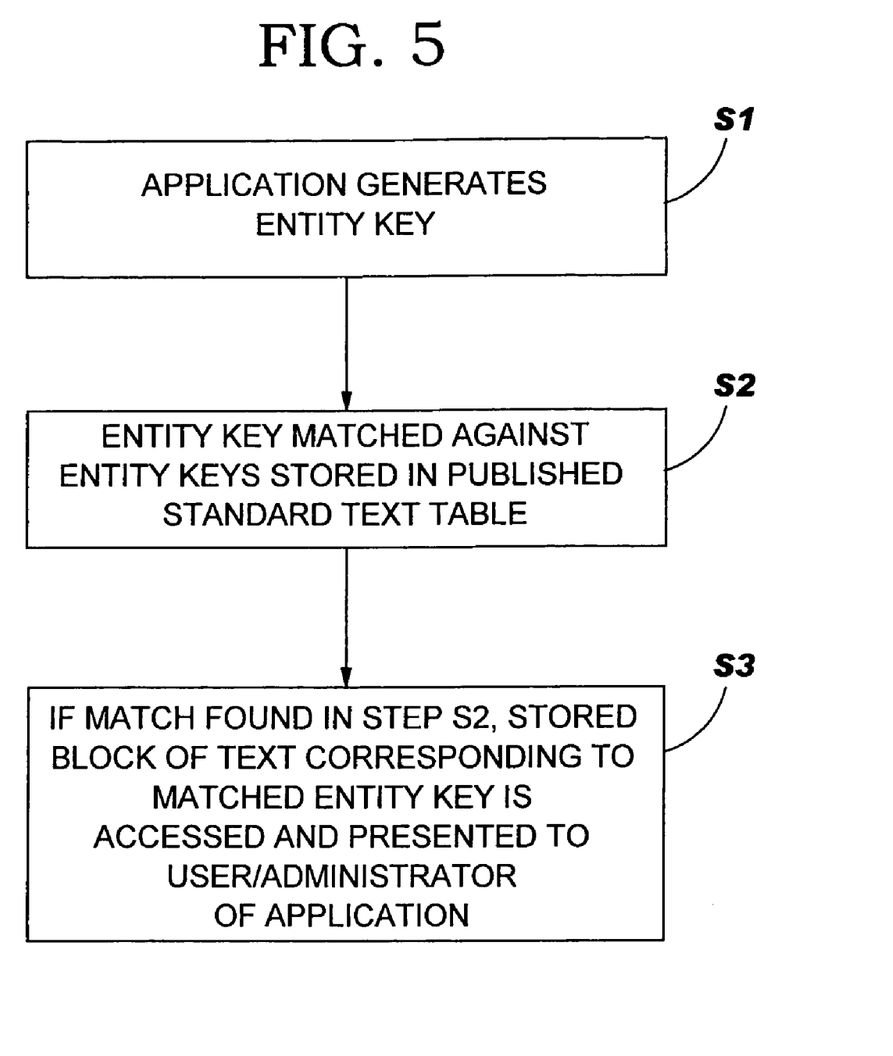
FIG. 5 depicts a flow diagram illustrating the use of the entity keys stored in the published standard text table by an application.

A flow diagram illustrating the use of the entity keys 60 stored in the published standard text table 24 by an application is illustrated in FIG. 5. In step S1, an application generates an entity key based on information available to the application. In step S2, the application determines if the entity key generated by the application matches an entity key 60 stored in the published standard text table 24. If a match is found, the block of text in the standard text table 16 or standard text language table 18 corresponding to the matching entity key 60 is accessed and presented in step S3 to a user/administrator of the application using the standard text technology 32 set forth in the corresponding standard text type 30.

It should be appreciated that the teachings of the present invention could be offered as a business method on a subscription or fee basis. For example, computer system 100 could be created, maintained and/or deployed by a service provider that offers the functions described herein for customers. That is, a service provider could be used to configure blocks of text and to define the circumstances under which the blocks of text are to be displayed to users by multiple applications as describe above. It should also be understood that the present invention can be realized in hardware, software, or any combination thereof. Any kind of computer/server system(s)—or other apparatus adapted for carrying out the methods described herein—is suited. A typical combination of hardware and software could be a general purpose computer system with a computer program that, when loaded and executed, carries out the respective methods described herein. Alternatively, a specific use computer, containing specialized hardware for carrying out one or more of the functional tasks of the invention, could be utilized. The present invention can also be embedded in a computer program, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

We claim:

1. A method for configuring and publishing text to multiple applications, comprising:
 providing a block of text to be published;
 selecting at least one application that will use the block of text;
 defining at least one business entity to which the block of text pertains, wherein each business entity comprises an item of data associated with a business, wherein each business entity can be shared by a plurality of different applications, and wherein each business entity can be used by a single application, but shared across multiple instances of the single application;
 defining criteria under which the block of text will be used by each selected application based upon an entry in a standard text publisher table, the entry including an identifier for the selected application and a role corresponding to the selected application, the role being authorized to publish to the selected application;
 repeating the above steps for each additional block of text to be published; and
 publishing at least one of the blocks of text to at least one selected application;
 wherein providing each block of text to be published comprises:
 authoring the block of text;
 storing the block of text in a standard text table;
 providing at least one translation of the block of text, if required; and
 storing each translation of the block of text in a standard text translation table, wherein each translation of the block of text stored in the standard text translation table is linked to the block of text stored in the standard text table.

2. The method of claim 1, further comprising:
 defining at least one standard text type;
 storing each standard text type in a standard text type table; and
 linking the block of text to a standard text type stored in the standard text type table.

3. The method of claim 2, wherein each standard text type comprises:
 a standard text technology; and
 publishing characteristics.

4. The method of claim 3, wherein the standard text technology is selected from the group consisting of flat text, HyperText Markup Language (HTML), Extensible Markup Language (XML), and a Uniform Resource Locator (URL).

5. The method of claim 3, wherein the publishing characteristics comprise at least one of:

date range;
edit control information;
description requirement; and
multiple publication control information.

6. The method of claim 1, wherein each business entity can comprise a combination of other business entities.

7. The method of claim 6, wherein defining at least one business entity further comprises:
storing each business entity in a publishing entity table.

8. The method of claim 7, further comprising:
generating, using an entity builder, an entity key required to publish the block of text, wherein the entity builder is linked to the publishing entity table.

9. The method of claim 8, wherein generating an entity key comprises:
providing a choice list for each business entity to which the block of text pertains, wherein each choice list comprises at least one specific instance of the corresponding business entity;
selecting an instance of each business entity from each choice list;
building the entity key based on the selected instance of each business entity; and
storing the entity key in a published standard text table.

10. The method of claim 9, further comprising:
matching a key defined by an application against the entity keys stored in the published standard text table; and
publishing the block of text associated with the matching key to the application.

11. The method of claim 10, wherein publishing the block of text associated with the matching key comprises:
identifying the block of text that is associated with the matching key;
retrieving the identified block of text;
identifying a standard text type of the block of text; and
identifying the application to which the block of text is to be published.

12. A system for configuring and publishing text to multiple applications, comprising:
at least one computer device, including:
a system for providing a plurality of blocks of text to be published;
a system for selecting at least one application that will use each block of text;
a system for defining at least one business entity to which each block of text pertains, wherein each business entity comprises an item of data associated with a business, wherein each business entity can be shared by a plurality of different applications, and wherein each business entity can be used by a single application, but shared across multiple instances of the single application;
a system for defining criteria under which each block of text will be used by each selected application based upon an entry in a standard text publisher table, the entry including an identifier for the selected application and a role corresponding to the selected application, the role being authorized to publish to the selected application; and
a system for publishing at least one of the blocks of text to at least one selected application;
wherein the system for providing the plurality of blocks of text to be published comprises:
a system for authoring each block of text;
a system for storing each block of text in a standard text table;
a system for providing at least one translation of each block of text, if required; and
a system for storing each translation in a standard text translation table, wherein each translation stored in the standard text translation table is linked to one of the blocks of text stored in the standard text table.

13. The system of claim 12, further comprising:
a system for defining at least one standard text type, and for storing each standard text type in a standard text type table, wherein each block of text is linked to a standard text type stored in the standard text type table.

14. The system of claim 13, wherein each standard text type comprises:
a standard text technology; and
publishing characteristics.

15. The system of claim 12, wherein each business entity can comprise a combination of other business entities.

16. The system of claim 15, further comprising:
an entity builder for generating an entity key required to publish the block of text, wherein the entity builder is linked to a publishing entity table for storing the business entities.

17. The system of claim 16, wherein the system for generating an entity key comprises:
a system for providing a choice list for each business entity to which the block of text pertains, wherein each choice list comprises at least one specific instance of the corresponding business entity;
a system for selecting an instance of each business entity from each choice list;
a system for building the entity key based on the selected instance of each business entity; and
a published standard text table for storing the entity key.

18. The system of claim 17, further comprising:
a system for matching a key defined by an application against the entity keys stored in the published standard text table; and
a system for publishing the block of text associated with the matching key to the application.

19. A computer program stored on a recordable storage medium, which when executed, configures and publishes text to multiple applications, comprising:
program code for providing a block of text to be published;
program code for selecting at least one application that will use the block of text;
program code for defining at least one business entity to which the block of text pertains, wherein each business entity comprises an item of data associated with a business, wherein each business entity can be shared by a plurality of different applications, and wherein each business entity can be used by a single application, but shared across multiple instances of the single application;
program code for defining criteria under which the block of text will be used by each selected application based upon an entry in a standard text publisher table, the entry including an identifier for the selected application and a role corresponding to the selected application, the role being authorized to publish to the selected application;
program code for repeating the above steps for each additional block of text to be published; and
program code for publishing at least one of the blocks of text to at least one selected application;
wherein the program code for providing each block of text to be published comprises:
program code for authoring the block of text;
program code for storing the block of text in a standard text table;

program code for providing at least one translation of the block of text, if required; and program code for storing each translation of the block of text in a standard text translation table, wherein each translation of the block of text stored in the standard text translation table is linked to the block of text stored in the standard text table.

20. The computer program of claim 19, further comprising:
program code for defining at least one standard text type;
program code for storing each standard text type in a standard text type table; and
program code for linking the block of text to a standard text type stored in the standard text type table.

21. The computer program of claim 20, wherein each standard text type comprises:
a standard text technology; and
publishing characteristics.

22. The computer program of claim 21, wherein the standard text technology is selected from the group consisting of flat text, HyperText Markup Language (HTML), Extensible Markup Language (XML), and a Uniform Resource Locator (URL).

23. The computer program of claim 21, wherein the publishing characteristics comprise at least one of:
date range;
edit control information;
description requirement; and
multiple publication control information.

24. The computer program of claim 19, wherein each business entity can comprise a combination of other business entities.

25. The computer program of claim 24, wherein the program code for defining at least one business entity further comprises:
program code for storing each business entity in a publishing entity table.

26. The computer program of claim 25, further comprising:
program code for generating, using an entity builder, an entity key required to publish the block of text, wherein the entity builder is linked to the publishing entity table.

27. The computer program of claim 26, wherein generating an entity key comprises:
program code for providing a choice list for each business entity to which the block of text pertains, wherein each choice list comprises at least one specific instance of the corresponding business entity;
program code for selecting an instance of each business entity from each choice list;
program code for building the entity key based on the selected instance of each business entity; and program code for storing the entity key in a published standard text table.

28. The computer program of claim 27, further comprising:
program code for matching a key defined by an application against the entity keys stored in the published standard text table; and
program code for publishing the block of text associated with the matching key to the application.

29. The computer program of claim 28, wherein publishing the block of text associated with the matching key comprises:
program code for identifying the block of text that is associated with the matching key;
program code for retrieving the identified block of text;
program code for identifying a standard text type of the block of text; and
program code for identifying the application to which the block of text is to be published.

30. A system for deploying an application for configuring and publishing text to multiple applications, comprising:
a computer system being operable to:
provide a plurality of blocks of text to be published;
select at least one application that will use each block of text;
define at least one business entity to which each block of text pertains, wherein each business entity comprises an item of data associated with a business, wherein each business entity can be shared by a plurality of different applications, and wherein each business entity can be used by a single application, but shared across multiple instances of the single application;
define criteria under which each block of text will be used by each
selected application based upon an entry in a standard text publisher table, the entry including an identifier for the selected application and a role corresponding to the selected application, the role being authorized to publish to the selected application; and
publish at least one of the blocks of text to at least one selected application;
wherein providing each block of text to be published comprises:
authoring the block of text;
storing the block of text in a standard text table;
providing at least one translation of the block of text, if required; and
storing each translation of the block of text in a standard text translation table, wherein each translation of the block of text stored in the standard text translation table is linked to the block of text stored in the standard text table.

* * * * *